Feb. 14, 1939.  A. L. KNAPP  2,146,826
MOTOR VEHICLE
Filed Sept. 19, 1934   2 Sheets-Sheet 1
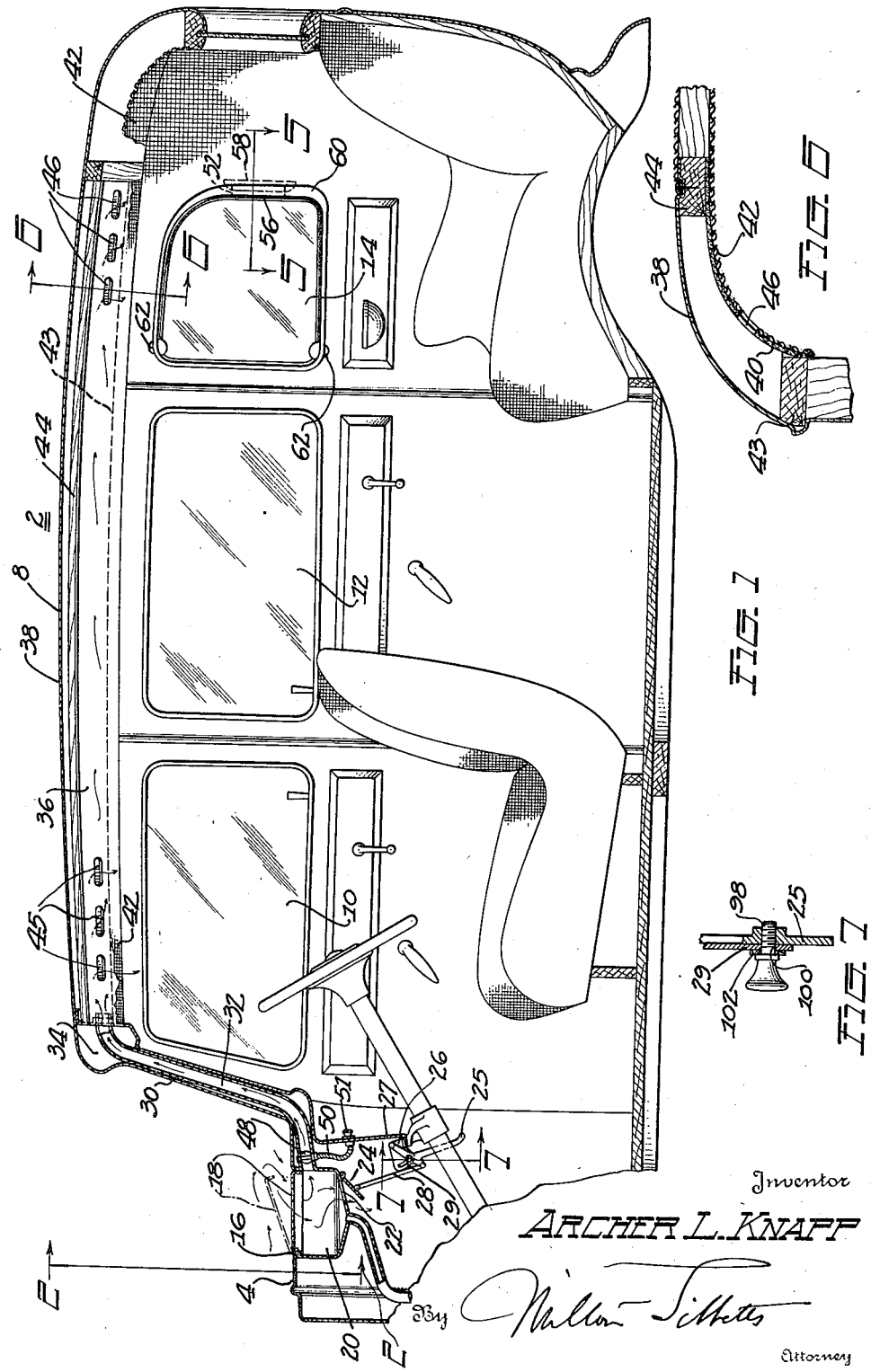
Inventor
ARCHER L. KNAPP
By William Tibbetts
Attorney Feb. 14, 1939.　　　A. L. KNAPP　　　2,146,826
MOTOR VEHICLE
Filed Sept. 19, 1934　　　2 Sheets-Sheet 2
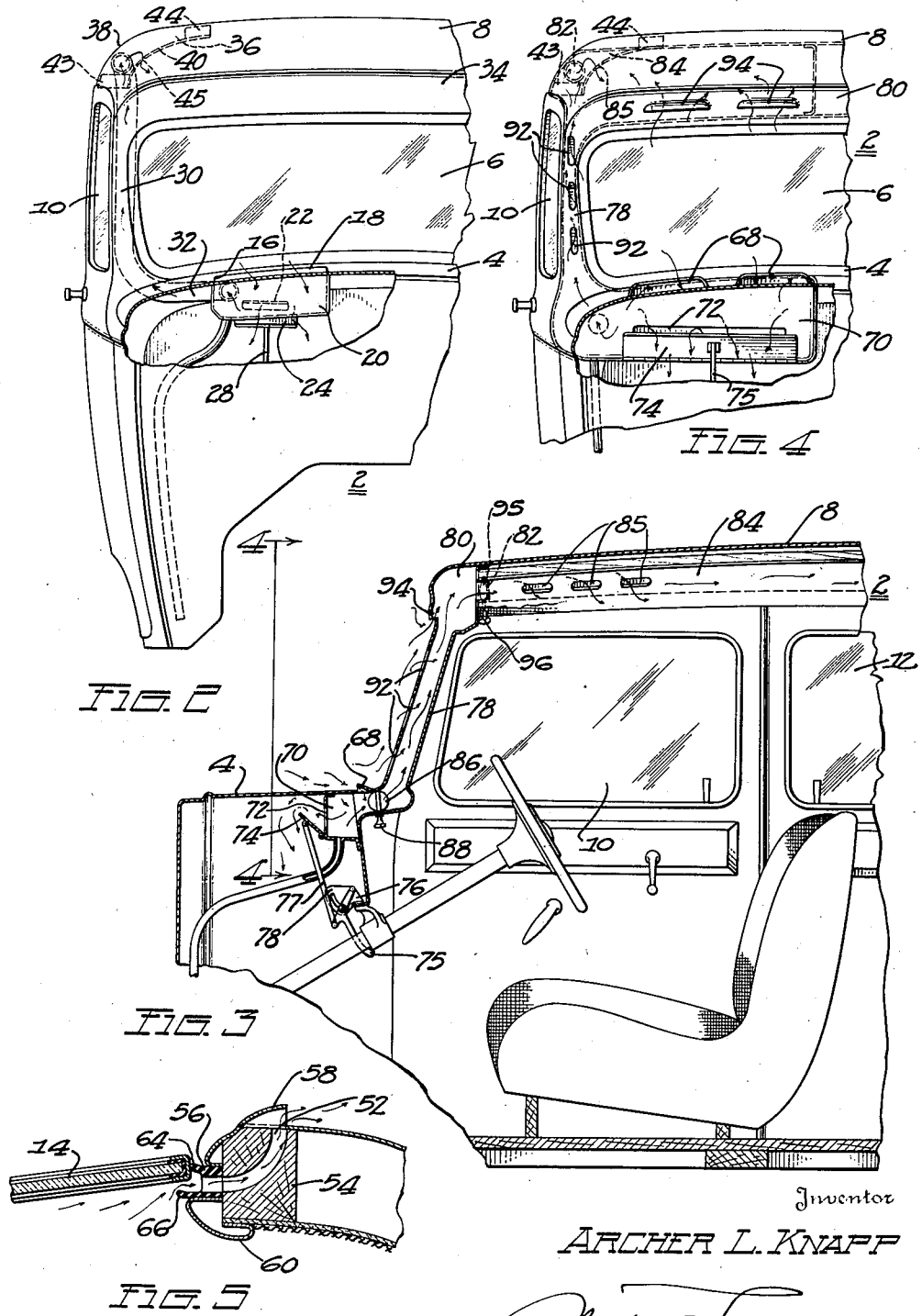

Patented Feb. 14, 1939

2,146,826

UNITED STATES PATENT OFFICE 2,146,826

MOTOR VEHICLE

Archer L. Knapp, Detroit, Mich., assignor to Packard Motor Car Company, Detroit, Mich., a corporation of Michigan Application September 19, 1934, Serial No. 744,625

12 Claims. (Cl. 98—2)

This invention relates to motor vehicles of the closed type and more particularly to constructions for producing a circulation of air through the bodies of such vehicles.

One object of the invention is to improve the construction and mode of operation of devices for producing and controlling the flow of air currents through the bodies of closed motor vehicles and to produce a novel and improved vehicle construction in which currents of air sufficient to ventilate a vehicle thoroughly will be induced during the movement of the vehicle without the production of drafts.

Another object of the invention is to produce an improved construction for motor vehicles by which air will be forced into a vehicle by pressure and will be withdrawn from the vehicle by ejector action.

Another object of the invention is to produce a construction for motor vehicles by which air may be introduced into the body of a vehicle adjacent the windshield and conducted therefrom downwardly into the lower portion of the body or upwardly into the upper portion of the body or into both portions simultaneously.

Another object of the invention is to provide motor vehicles with a novel and improved ejection construction for withdrawing air from a vehicle.

With the above and other objects in view the invention consists in a construction embodying the novel and improved features hereinafter described and particularly pointed out in the claims, the advantages of which will be readily understood by those skilled in the art.

The various features of the invention will be clearly understood from the accompanying drawings illustrating the invention in its preferred form and the following detailed description of the constructions therein shown.

In the drawings Fig. 1 is a view in longitudinal section of a motor vehicle embodying the invention;

Fig. 2 is a view of the body construction illustrated in Fig. 1 partly in end elevation, partly broken away and partly in vertical section taken substantially on the line 2—2 of Fig. 1;

Fig. 3 is a view in longitudinal section of the forward portion of a motor vehicle embodying the principal features of the invention in different form;

Fig. 4 is a view of the body construction shown in Fig. 3 partly in end elevation, partly broken away and partly in vertical section taken substantially on the line 4—4 of Fig. 3;

Fig. 5 is a detail view in horizontal section taken substantially on the line 5—5 of Fig. 1;

Fig. 6 is a detail sectional view taken substantially on the line 6—6 of Fig. 1, and Fig. 7 is a detail sectional view taken substantially on the line 7—7 of Fig. 1.

The invention is illustrated in this application as applied to the body of a motor vehicle indicated as a whole at 2 having a cowl 4, a windshield 6 at the rear end of the cowl, a roof portion 8 and side windows 10, 12 and 14.

On each side of a central vertical plane extending longitudinally of the vehicle, duplicate constructions are provided for introducing air into the vehicle, for causing a circulation of this air through different parts of the vehicle and for withdrawing the air from the vehicle. Only one of these constructions is described herein, it being understood that the vehicle is provided with the same construction upon the opposite side of said central plane.

In the form of the invention shown in Figs. 1 and 2, to provide for the introduction of air into the body of the vehicle, the cowl 4 is provided with an opening 16 which is arranged to be closed by means of a ventilator 18. The ventilator is pivoted at its forward edge so that it may be moved from the closed position shown in full lines in Fig. 1 to the open position shown in dot-and-dash lines in said figure. Any suitable devices may be provided for pivotally supporting the ventilator, for moving the same between closed and open positions and for holding the ventilator in adjusted position. It is not considered necessary for an understanding of the present invention to show these devices in this application.

The air entering the opening 16 is received in a chamber 20 secured within the cowl. In order that the air may pass from this chamber into the space within the cowl, the chamber is provided with an opening 22, and a hinged damper 24 is arranged to control the passage of air through this opening. An adjusting lever 25 is pivoted to a bracket 26 secured to the instrument board 27 and is connected by a link 28 with the damper 24. The lever is arranged to move along a quadrant 29 secured to the instrument board and is held in adjusted position with relation to the quadrant by a suitable fraction device.

At the sides of the windshield 6 are arranged the pillars 30 for supporting the roof portion of the body. In the present construction these pillars are hollow.

The air from the chamber 20 is passed from said chamber rearwardly and upwardly into the roof portion of the vehicle by means of a pipe 32 the forward end of which is connected with the chamber and which passes from the chamber rearwardly within the cowl and upwardly through the pillar 30 and through the header bar 34 which also is of hollow construction. The upper end of the pipe 32 passes through the rear wall of the header bar and is arranged to discharge air into a conduit 36 extending longitudinally of the vehicle along one side of the roof portion. The conduit 36 is formed between the roof proper 38 of the vehicle and a reinforcing wall or lining 40 located within the headlining 42 and between the longitudinal strips 43 and 44 forming part of the skeleton frame of the roof portion. If any cross braces or bars are employed connecting the strips 43 and 44 these braces are cut away or are made of such dimensions as to provide for the passage of air.

The conduit 36 preferably extends throughout the greater part of the length of the roof portion of the vehicle as clearly shown in Fig. 1. In order to provide for the passage of air from said conduit into the interior of the body of the vehicle, the wall 40 and the headlining 42 are provided with openings 45 located adjacent the forward portion of the body and with openings 46 located adjacent the rear portion of the body.

To control the flow of air from the chamber 20 through the pipe 32 into the roof portion of the vehicle, a damper 48 is pivoted within said pipe and a flexible shaft 50 is connected with said damper. To the lower end of this shaft is attached an adjusting knob 51 rotatably mounted upon the instrument board 27.

The vehicle is provided on each side thereof with an ejector for withdrawing air from the vehicle. This ejector comprises a curved passage 52 (see Fig. 5) extending through the upright 54 forming part of the vehicle frame and through the weather strip 56 preferably made of rubber and attached to this upright, both upright and weather strip being located immediately to the rear of the window 14. Mounted on the outside of the vehicle body is a deflecting plate 58 which extends over the outlet end of the passage 52 and engages the weather strip on one side thereof as clearly shown in Fig. 5. A moulding 60 is mounted on the inside of the vehicle and supports the weather strip on the other side as shown in this figure.

The flow of air from the vehicle through the passage 52 is controlled by the window 14, the passage being closed when the window is in one position and being open when the window is in another position. The window is pivoted adjacent its forward margin upon trunnions 62. The rear margin of the window is arranged to engage the flanges 64 and 66 on the weather strip 56. When the window is in its inner position, the rear margin of the window engages both the flanges 64 and 66 and the passage 52 is thereby closed at its forward end. When the window is swung outwardly into the position shown in Fig. 5, the rear margin of the window is disengaged from the flange 66 allowing the air from within the vehicle to pass between the window and said flange and to pass outwardly through the passage 52. When in this position the margin of the window engages the flange 64, however, to prevent the passage of the outside air between the window and said flange.

With the above construction, if the ventilator 18 is in open position, air striking the lower portion of the windshield during the forward movement of the vehicle will be deflected forwardly beneath the ventilator through the opening 16 into the chamber 20 under substantial pressure. If the damper 24 is in open position, the air from said chamber will flow downwardly through the opening 22 into the space within the cowl and will flow therefrom rearwardly. If the damper 48 is open, air from the chamber 20 will flow rearwardly and upwardly through the pipe 32 and will be discharged from the upper end of said pipe into the conduit 36 from which it will pass into the interior of the vehicle through the openings 45 and 46. With the window 14 adjusted in the position shown in Fig. 5, the air within the vehicle will be withdrawn by ejector action through the passage 52. Thus the air may be forced into the forward portion of the vehicle body under pressure and may be withdrawn from the rear portion of said body by ejector action thereby creating a very thorough and efficient ventilation of the body. By closing the damper 48 and opening the damper 24, all of the air entering the chamber 20 may be directed into the space within the cowl. By closing the damper 24 and opening the damper 48, all of the air entering the chamber 20 may be directed upwardly into the conduit 36. By a proper adjustment of said dampers, the flow of the air into the cowl and into the upper portion of the vehicle body may be regulated as desired.

In the form of the invention shown in Figs. 3 and 4, the cowl is provided with louvers 68 for the entrance of air into the body of the vehicle, these louvers facing forwardly as shown in Fig. 2 so as to form air scoops to catch the air and direct the same inwardly during the forward movement of the vehicle. From the louvers 68, the air passes into a chamber 70 located within the cowl.

To provide for the passage of air from the chamber 70 into the space within the cowl, the chamber is formed with an opening 72 in its forward wall and the air flow therethrough is controlled by a pivoted damper 74. The damper 74 is adjusted manually by means of an adjusting lever 75 pivoted to a bracket 76 attached to the instrument board and connected with the damper by means of a link 77. The said lever is arranged to swing alongside a quadrant 78 secured to the instrument board and is held in adjusted position by means of a suitable friction device.

In order that the air in the chamber 70 may pass upwardly from said chamber into the roof portion of the vehicle, the chamber is connected with the lower end of the supporting pillar 78 at the side of the windshield which is of tubular construction and forms a passage for the air. The upper end of the pillar is connected with the header bar 80 which is also of hollow formation. The header bar is provided with an outlet nozzle 82 which connects said bar with the forward end of the conduit 84 extending longitudinally of the vehicle on one side of the roof portion. This conduit, as shown in the drawings, has the same construction, arrangement and mode of operation as the conduit 36 shown in Figs. 1 and 2, the air passing from the conduit 84 into the interior of the vehicle through the openings 85 adjacent the forward end of said conduit and through similar openings (not shown) adjacent the rear end of said conduit.

The flow of air from the chamber 70 upwardly into the pillars 78 is controlled by a pivoted damper 86 to one of the pivots of which is attached an operating knob 88 projecting within the body of the vehicle.

To enable the flow of air from the hollow header bar 80 into the conduit 84 to be controlled, a pivoted damper 95 is mounted within the outlet nozzle 82. To one of the pivots of said damper is attached a knob 96 projecting within the headlining.

The air entering the vehicle through the louvers 68 may not be sufficient to ventilate properly the vehicle. To provide for the entrance of additional air into the vehicle, the pillar 78 is provided with slots 92 on the forward side thereof, and the hollow header bar 80 is provided with louvers 94.

The friction device for holding the lever 25 and the damper 24 in adjusted position is shown in detail in Fig. 7. This device comprises a screw 98 passing through a slot 100 in the quadrant 29 and threaded into the lever 25. A friction washer 102 is interposed between the head of the screw 98 and the quadrant.

Substantially the same construction is employed for holding the lever 75 shown in Fig. 3 in position.

In the constructions shown in Figs. 3 and 4, during the forward movement of the vehicle air is forced into the chamber 70 through the louvers 68, into the pillars 78 through the slots 92 and into the hollow header bar 80 through the louvers 94. Various results may be secured by the adjustment of the dampers 74, 86 and 95. When the damper 85 is closed and the damper 74 is in open position, the air entering the chamber 70 will flow outwardly through the opening 72 into the space within the cowl and the air entering the pillar 78 and the hollow header bar 80 will flow into the conduit 84, assuming that the damper 95 is then in open position. If the dampers 74, 86 and 95 are all in open positions, part of the air entering the chamber 70 will flow into the space within the cowl and part of said air will flow upwardly into the pillars 78. The latter part of the air together with the principal part of the air entering the slots 92 will flow upwardly into the hollow header bar 80 and thence into the conduit 84. If the damper 95 is closed and the dampers 86 and 74 are in open position, the air entering the hollow header bar, the pillars 78 and the chamber 70 will flow through the opening 72 into the cowl. Thus the flow of air into the body of the vehicle may be readily regulated by persons in the vehicle so as to produce an efficient ventilation without drafts.

It is to be understood that the invention is not limited to the particular construction and arrangement of parts of the illustrated embodiment of the invention, but that the construction shown and described is merely illustrative of the invention and that the invention may be embodied in other forms within the scope of the claims.

Having explained the nature and object of the invention and having specifically described a construction embodying the invention in its preferred form, what is claimed is:

1. A ventilating system for motor vehicles comprising means formed in the cowl for the entrance of air into a vehicle, means for conducting part of said air into the roof portion of the vehicle and means for conducting part of said air into the cowl space.

2. A ventilating system for closed motor vehicle bodies having a cowl portion comprising a chamber in the cowl portion of the body, means for the entrance of unheated air into the chamber in the cowl portion of a vehicle body, supports at the sides of the windshield having passages communicating with said chamber through which the air flows longitudinally of the supports into the roof portion of the vehicle and passages in the roof portion connected with and extending rearwardly from said first passages.

3. A ventilating system for motor vehicle bodies comprising cowl inlet means providing for the entrance of unheated air into the interior cowl portion of the body and means for conducting air entering through said inlet means directly to the interior roof portion of the body.

4. A ventilating system for motor vehicle bodies having a cowl space comprising a chamber within the cowl space, inlet means for the entrance of unheated air into the chamber, conduits at the sides of the windshield for conducting the air entering the forward portion of the bodies through the inlet means into the roof portion of the vehicle body, conduits extending rearwardly at each side of the body roof portion for conducting rearwardly the air from the conduits and openings for the passage of air from said rearwardly extending conduits into the interior of the vehicle body.

5. A ventilating system for motor vehicle bodies having a cowl space comprising a chamber in the cowl space open to air exterior of the body, means for introducing air into the chamber by pressure, conduit means for conducting air from the chamber and releasing it directly to the roof portion of the vehicle body, means for conducting air entering the chamber in the cowl space to the body, and devices at the rear of the body and below the roof portion thereof for withdrawing air from the body by ejector action.

6. A ventilating system for motor vehicle bodies having a cowl space comprising a chamber in the cowl space open to air exterior of the body, means for introducing air into the chamber by pressure, passages for conducting air from the chamber to the roof portion of the body, passages on each side of the roof portion of the body for conducting air rearwardly from said first mentioned passages, openings from the roof portion passages into the interior of the body, and means on each side of the vehicle for withdrawing air from the interior of the body by ejector action.

7. In a ventilating system for motor vehicles, an ejector tube leading from the inside to the outside of a vehicle and a movable window arranged in one position to close the window opening and cut off communication between the outside and the inside of the vehicle through said tube, and in another position to close the window opening and to open communication between the inside and the outside of the vehicle through said tube.

8. In a ventilating system for motor vehicles, a window opening weather strip having an air ejector opening therethrough, and a window arranged in one position to close the window opening and cut off communication between the inside and the outside of the vehicle through said weather strip opening, and in another position to close the window opening and to open communication between the inside and the outside of the vehicle through said weather strip opening.

9. In a ventilating system for motor vehicles, a body structure having a window opening therein and an air ejector opening therein leading from the window opening to the exterior, a weather strip for the window opening having an opening therethrough in communication with the ejector opening, and a movable window co-operating with said weather strip and arranged in one position thereof to close the strip opening, and in another position to open the weather strip opening without disengaging the weather strip.

10. In a ventilating system for motor vehicles, a weather strip having spaced flanges, an ejector passage leading from the inside to the outside of a vehicle between said flanges and a window movable transversely of its plane and arranged when in an inner position to engage with the inner flange on said weather strip and close said passage, and when in an outer position to disengage the inner flange and engage the outer flange on said strip to open said passage.

11. In a ventilating system for a motor vehicle body comprising a hollow pillar, a pipe co-extensive with the hollow portion of the pillar and extending through the ends thereof, and conduit means connected with the end of said pipe projecting through the upper end of said pillar, said conduit means extending longitudinally of the vehicle roof and communicating with the interior rear end of said body, the end of said pipe projecting from the lower end of said pillar being in communication with air exterior of the body.

12. A ventilating system for motor vehicles comprising means formed in the cowl for admitting air into the vehicle, means for conducting a part of the admitted air into the roof portion of the vehicle, means for conducting a part of the admitted air into the cowl space in the vehicle, and means for regulating the flow of air through both of said conducting means.

ARCHER L. KNAPP.